United States Patent
Kubota

(10) Patent No.: US 11,859,682 B2
(45) Date of Patent: Jan. 2, 2024

(54) BRAKE DISC

(71) Applicant: SUNSTAR ENGINEERING INC., Osaka (JP)

(72) Inventor: Satoshi Kubota, Osaka (JP)

(73) Assignee: SUNSTAR ENGINEERING INC., Osaka (JP)

( * ) Notice: Subject to any disclaimer, the term of this patent is extended or adjusted under 35 U.S.C. 154(b) by 152 days.

(21) Appl. No.: 17/441,024

(22) PCT Filed: Mar. 2, 2020

(86) PCT No.: PCT/JP2020/008580
§ 371 (c)(1),
(2) Date: Sep. 20, 2021

(87) PCT Pub. No.: WO2020/195561
PCT Pub. Date: Oct. 1, 2020

(65) Prior Publication Data
US 2022/0154791 A1    May 19, 2022

(30) Foreign Application Priority Data
Mar. 22, 2019    (JP) .................................. 2019-054376

(51) Int. Cl.
*F16D 65/12*    (2006.01)
*B62L 1/00*    (2006.01)
*F16D 65/02*    (2006.01)

(52) U.S. Cl.
CPC ................ *F16D 65/12* (2013.01); *B62L 1/00* (2013.01); *F16D 2065/1332* (2013.01)

(58) Field of Classification Search
CPC ........... F16D 65/12; F16D 65/123–127; F16D 2065/1332; B62L 1/00

(Continued)

(56) References Cited

U.S. PATENT DOCUMENTS

2005/0092561 A1* 5/2005 Okabe .................... B62L 1/005
188/24.11
2005/0161296 A1 7/2005 Okabe
(Continued)

FOREIGN PATENT DOCUMENTS

CN    106969069    7/2017
EP    2 112 398    10/2009
(Continued)

OTHER PUBLICATIONS

International Search Report dated Apr. 28, 2020 in International (PCT) Application No. PCT/JP2020/008580.
(Continued)

*Primary Examiner* — Christopher P Schwartz
(74) *Attorney, Agent, or Firm* — Wenderoth, Lind & Ponack, L.L.P.

(57) ABSTRACT

A brake disc includes an outer circumferential portion including a waveform portion having recessed portions and projecting portions repeatedly formed over an outer circumference, and for the outer circumferential portion to have substantially uniform heat capacity distribution in a circumferential direction and in a radial direction, the outer circumferential portion is formed such that a ratio of a difference in heat capacities among a plurality of circumferential sections in the outer circumferential portion, which are sectioned at an equal angle in the circumferential direction, relative to a heat capacity of each circumferential section is equal to or less than a first predetermined ratio. A ratio of a difference in heat capacities among radial sections in the outer circumferential portion, which are sectioned to have an equal length in the radial direction, relative to a heat capacity of each radial section is equal to or less than a second predetermined ratio.

9 Claims, 13 Drawing Sheets

(58) Field of Classification Search
USPC .......................................... 188/18 A, 218 XL
See application file for complete search history.

(56) References Cited

U.S. PATENT DOCUMENTS

| | | | |
|---|---|---|---|
| 2007/0102247 A1 | 5/2007 | Takenaka et al. | |
| 2008/0041675 A1* | 2/2008 | Baumgartner | F16D 65/12 188/218 XL |
| 2009/0139807 A1* | 6/2009 | Fryska | F16D 65/12 188/218 XL |
| 2011/0016943 A1 | 1/2011 | Takenaka et al. | |
| 2017/0370431 A1* | 12/2017 | Dunlap | F16D 65/125 |

FOREIGN PATENT DOCUMENTS

| | | |
|---|---|---|
| JP | 4155301 | 9/2008 |
| JP | 2008-298094 | 12/2008 |
| JP | 2009-197853 | 9/2009 |
| JP | 2011-33132 | 2/2011 |
| JP | 4973586 | 7/2012 |
| JP | 2016-038029 | 3/2016 |
| WO | 2004/042247 | 5/2004 |

OTHER PUBLICATIONS

Extended European Search Report dated Nov. 29, 2022 in corresponding European Patent Application No. 20777430.8.

* cited by examiner

NON-CLEANING PORTION
NOT INCLUDED

PRESENT DISC 1

NON-CLEANING PORTION
INCLUDED

DISC A IN RELATED ART

51mm²

PRESENT DISC 1

333mm²

DISC A IN RELATED ART

54mm²

PRESENT DISC 1

137mm²

DISC A IN RELATED ART

NON-CLEANING PORTION INCLUDED

NON-CLEANING PORTION INCLUDED

NON-CLEANING PORTION INCLUDED

DISC B IN RELATED ART

DISC C IN RELATED ART

DISC D IN RELATED ART (PERFECT CIRCLE)

215mm²

66mm²

200mm²

DISC B IN RELATED ART

DISC C IN RELATED ART

DISC D IN RELATED ART (PERFECT CIRCLE)

97mm²

DISC B IN RELATED ART

DISC C IN RELATED ART

DISC D IN RELATED ART (PERFECT CIRCLE)

Fig. 10

| | HEAT CAPACITY (ENTIRE PART) | DIFFERENCE IN HEAT CAPACITIES IN CIRCUMFERENTIAL DIRECTION | DIFFERENCE IN HEAT CAPACITIES IN RADIAL DIRECTION | SURFACE AREA OF SIDE SURFACE |
|---|---|---|---|---|
| PRIOR ART DISC | 166.2 J/K | C2'-C6' 1.8 J/K | r1'-r3' 4.4 J/K | 1487 mm² |
| DEVELOPED DISC | 166.3 J/K | C2-C5 0.6 J/K | r1-r2 0.7 J/K | 2469 mm² |

DISC A IN RELATED ART

MAXIMUM TEMPERATURE: 617°C

BRAKE DISC 1 ACCORDING TO FIRST EMBODIMENT

MAXIMUM TEMPERATURE: 572°C

RELATED ART

BRAKE DISC

TECHNICAL FIELD

The present invention relates to a brake disc including a waveform portion in which recessed portions and projecting portions are repeatedly formed over an outer circumference.

BACKGROUND ART

As brake discs used in motorcycles and the like, so-called "wave discs" including waveform portions in which recessed portions and projecting portions are repeatedly formed over outer circumferences are known (Patent Literatures 1 to 3 listed below, the disc A in FIG. 14) as well as brake discs with perfect circle shapes. The wave discs have higher degrees of freedom in design as compared with the perfect circle discs and have an advantage that small amounts of powder generated due to wear of brake pads are removed by the waveform portions.

However, temperature irregularity is more likely to increase in the wave discs than in the perfect circle discs due to their complicated shapes, and brake feeling is also degraded.

An improvement in brake feeling through an increase in heat capacities of the brake discs is also conceivable. In this case, it is possible to cause the heat capacities of the discs to increase through increases in areas of brake front surfaces and brake back surfaces of the discs on the assumption that plate thicknesses and disc materials are the same as those in the related art. However, the weights of the brake discs also increase with the increases in areas.

CITATION LIST

Patent Literature

PTL 1: Japanese Patent No. 4155301
PTL 2: Japanese Patent No. 4973586
PTL 3: Japanese Patent Laid-Open No. 2008-298094

SUMMARY OF INVENTION

Technical Problem

The present invention was made in view of the aforementioned facts, and an object thereof is to improve brake feeling of a brake disc including a waveform portion in which recessed portions and projecting portions are repeatedly formed over an outer circumference.

Solution to Problem

In order to solve the aforementioned problem, a brake disc according to the present invention includes: an outer circumferential portion that serves as a sliding portion area of a brake pad and includes a waveform portion in which recessed portions and projecting portions are repeatedly formed over an outer circumference, and in order for the outer circumferential portion to have substantially uniform heat capacity distribution in a circumferential direction and in a radial direction, the outer circumferential portion is formed such that a ratio of a difference in heat capacities among a plurality of circumferential sections in the outer circumferential portion, which are sectioned at an equal angle in the circumferential direction, relative to a heat capacity of each circumferential section is equal to or less than a first predetermined ratio, and a ratio of a difference in heat capacities among a plurality of radial sections in the outer circumferential portion, which are sectioned to have an equal length in the radial direction, relative to a heat capacity of each radial section is equal to or less than a second predetermined ratio. Here, the first predetermined ratio and the second predetermined ratio are defined to obtain, in the outer circumferential portion, substantially uniform heat capacity distribution in the circumferential direction and in the radial direction.

A preferred brake disc according to the present invention further includes: an inner circumferential portion that is formed on an inner side of the outer circumferential portion in the radial direction and serves as a non-sliding portion area of the brake pad, and a cleaning through-hole is formed across a boundary line between the outer circumferential portion and the inner circumferential portion, and an inner edge portion of the brake pad in the radial direction is able to intersect the cleaning through-hole.

Preferably, each of the circumferential sections is defined by a first circumferential boundary line extending in the radial direction through a minimum point of the recessed portion and a second circumferential boundary line extending in the radial direction through a maximum point of the projecting portions, and the first predetermined ratio is 25%.

Preferably, the plurality of radial sections are at least three radial sections, a radial section on an outermost side has a length in the radial direction that includes the waveform portion, and the second predetermined ratio is 8%.

Preferably, a plurality of through-holes are formed in the brake disc. In such a case, the recessed portions and the projecting portions of the waveform portion and the through-holes are formed to increase a surface area of a side surface of the brake disc to thereby achieve desired cooling efficiency.

The inner circumferential portion and the outer circumferential portion may be integrally molded. Alternatively, the inner circumferential portion may be coupled to the outer circumferential portion with coupling means.

The recessed portions of the waveform portion may be formed in an asymmetric manner between left and right.

BRIEF DESCRIPTION OF DRAWINGS

FIG. 9 is an outline partial view illustrating comparison with discs 2, 3, and 4 in the related art other than the disc A illustrated in FIG. 14, where

FIG. 10 is an outline view illustrating comparison related to entire heat capacities, a difference in heat capacities in a circumferential direction, a difference in heat capacities in a radial direction, and surface areas of side surfaces between the brake disc according to the first embodiment and the disc A in the related art illustrated in FIG. 14.

FIG. 14 is an outline view of the disc A in the related art, where

DESCRIPTION OF EMBODIMENTS

Hereinafter, an embodiment of the present invention will be described with reference to the drawings.

First Embodiment

Figure 1:
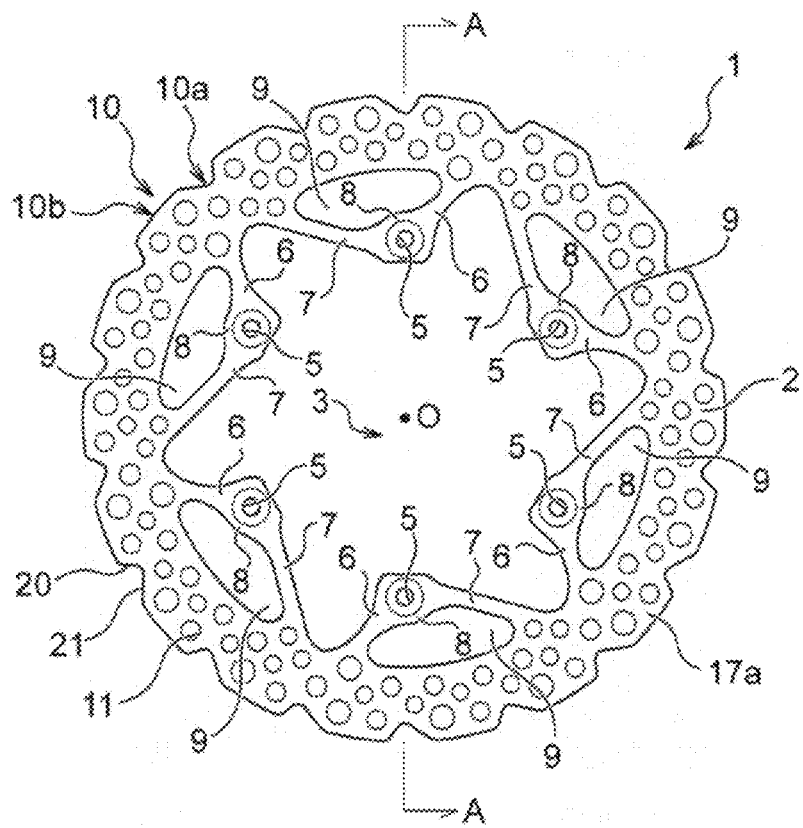
FIG. 1 is a front view of a brake disc according to a first embodiment of the present invention.
Figure 2:
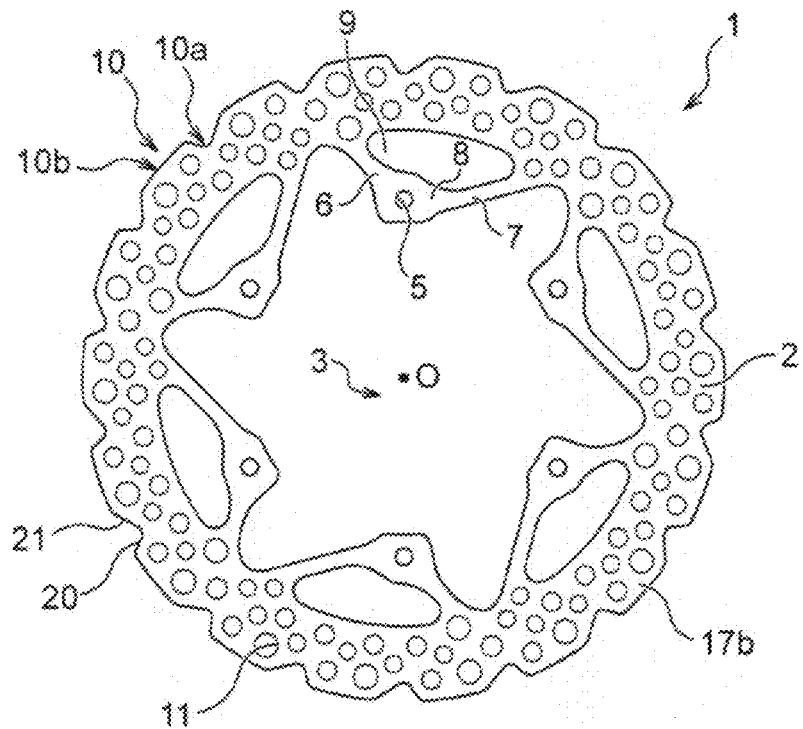
FIG. 2 is a back view of the brake disc according to the first embodiment.

FIGS. 1 to 5 illustrate a brake disc 1 according to a first embodiment of the present invention. The brake disc 1 is realized as a brake disc used in a bicycle, a motorcycle, or the like. Although aluminum, stainless steel, or carbon steel, for example, may be used as a material of the brake disc 1, the material is not limited to these examples. FIG. 1 is a view of the brake disc 1 when seen from a brake front surface 17a, and FIG. 2 is a view of the brake disc 1 when seen from a brake back surface 17b.

Figure 3:
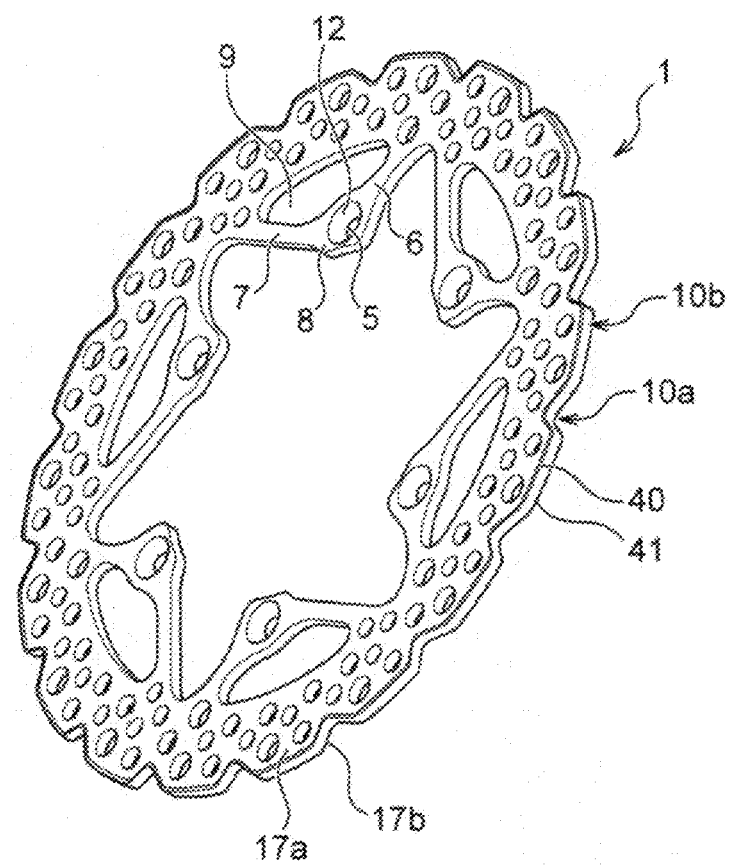
FIG. 3 is a perspective view of the brake disc according to the first embodiment.

As is best illustrated in FIGS. 1 to 3, the brake disc 1 includes an outer circumferential portion 2 on which a brake pad that is not illustrated is caused to abut and a load acts at the time of braking, a center opening portion 3 formed on an inner side of the outer circumferential portion 2, and a plurality of attachment holes 5 formed at positions projecting from the outer circumferential portion 2 toward the inside of the center opening portion 3 to attach the brake disc 1 to a rotating element (not illustrated) such as a wheel.

A flower petal-shaped waveform portion 10 composed of repetition of recessed portions 10a and projecting portions 10b is formed in a radial direction at an outer edge of the outer circumferential portion 2, and the outer circumferential portion 2 forms a pad pressurizing surface to which a brake pad that is not illustrated can be applied. For example, the brake pad can apply a brake force to the brake disc by a pair of pads abutting on the outer circumferential portion 2 from both surfaces, namely the brake front surface 17a and the brake back surface 17b. Therefore, a load is applied directly to the outer circumferential portion 2 in a direction opposite to a rotation direction of the brake disc 1 when rotation is delivered, that is, when the brake pad abuts on the outer circumferential portion 2 and a brake force is applied. Also, the pad pressurizing surface includes the projecting portions 10b of the waveform portion 10, and it is possible to remove a small amount of powder generated due to wear of the brake pad by each of the projecting portions 10b sequentially abutting on the brake pad with the recessed portions 10a interposed therebetween.

Each recessed portion 10a is formed of two side parts 20 and 21, and the shape of the recessed portion 10a is formed asymmetrically in the present embodiment. As the asymmetric shape, an angle of a tangential line of the side part 20 with respect to the radial direction is 45° or less, and an angle of a tangential line of the side part 21 is more than 45°, for example. Note that the shape of the waveform portion 10 is not limited to the illustrated example and can be changed in an arbitrary suitable manner in the present invention. For example, various forms such as symmetric recessed portions 10a, recessed portions 10a entirely formed into arc shapes, and recessed portions 10a, each of which is formed of three or more side parts, are included. It is a matter of course that the projecting portions 10b are also not limited to the illustrated example.

In addition, a plurality of through-holes 11 are also formed in the outer circumferential portion 2 for an improvement in heat dissipation through an increase in surface area, a light weight, an improvement in a braking property through reduction of moment of inertia, and an improvement in a wear debris and mud protection property.

Figure 6:
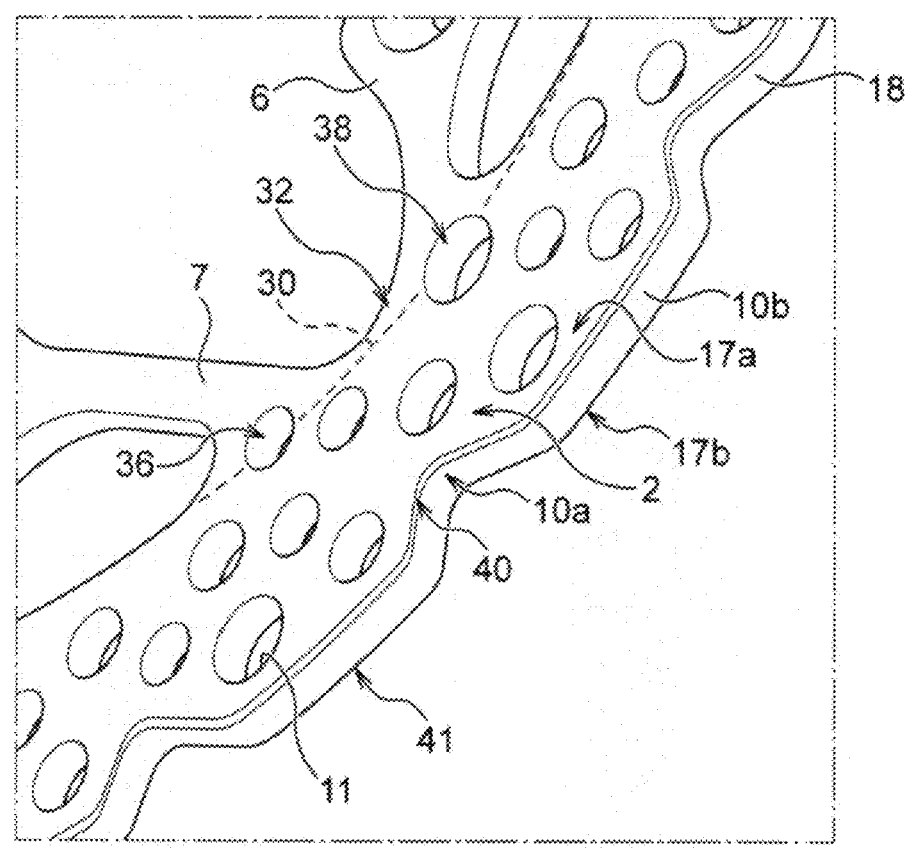
FIG. 6 is a partially enlarged view of the brake disc illustrated in FIG. 3.

FIG. 6 illustrates a partially enlarged view of the waveform portion composed of the recessed portions 10a and the projecting portions 10b. As illustrated in the drawing, the inner circumferential portion 32 is formed on the inner side of the outer circumferential portion 2 in the radial direction. The outer circumferential portion 2 serves as a sliding portion area of the brake pad, which is not illustrated, that is, a region on which the brake pad abuts while sliding, and the inner circumferential portion 32 serves as a non-sliding portion area of the brake pad, that is, a region on which the brake pad does not abut. If a boundary line between the outer circumferential portion 2 and the inner circumferential portion 32 is represented as 30, through-holes 36 and 38 are formed across the boundary line 30, in addition to the through-holes 11 formed in the outer circumferential portion 2, and an inner edge portion of the brake pad in the radial direction can intersect the through-holes 36 and 38. The through-holes 36 and 38 function as cleaning portions that remove a small amount of powder generated due to wear of the brake pad similarly to the recessed portions 10a and the projecting portions 10b which an outer edge portion of the brake pad in the radial direction can intersect.

Note that a chamfered portion 40 is formed at an outer circumferential edge portion at a boundary between the brake front surface 17a and an outer circumferential end surface 18, and a chamfered portion 41 is formed at an outer circumferential edge portion at a boundary between the brake back surface 17b and an outer circumferential end surface 18.

Next, the inner circumferential portion 32 of the brake disc 1 will be described. Note that the inner circumferential portion 32 described below is an example of the inner circumferential portion according to the present invention in which the outer circumferential portion 2 mainly has characteristic features, and the inner circumferential portion according to the present invention is not limited to this example.

In the examples in FIGS. 1 to 5, six attachment holes 5 are provided in the inner circumferential portion 32. In the illustrated example, the six attachment holes 5 are distributed in the circumferential direction such that center angles (divided angles), each of which is formed by two adjacent attachment holes 5 and 5 with respect to the center of the brake disc, become equal angles that are substantially equal to each other. In the case in which the number of attachment holes 5 is six, the equal angle is 360°/6=60°. Since arrangement of the attachment holes 5 is determined in accordance with a specification of the rotation element, such as a wheel, to which the brake disc 1 is attached, the arrangement is not necessarily limited to the arrangement of equal angle, in which each divided angle is equal. For example, it is possible to apply the present invention even if the divided angles are not uniform, such as divided angles of 50°, 55°, 60°, 65°, . . . (the arrangement may include partially uniform divided angles) in accordance with the specification of the wheel.

Also, the attachment holes 5 are formed at positions at an equal distance from a center O of the brake disc in the radial direction in the example in FIGS. 1 to 5. However, since the arrangement of the attachment holes 5 is determined in accordance with the specification of the wheel or the like in this regard as well, the distances of the attachment holes 5 from the center O in the radial direction are not necessarily equal to each other and may be different from each other (the arrangement may include partially uniform radii), and it is possible to apply the present invention to this case as well.

Each attachment hole 5 is formed in a region 8 in which a first crosspiece portion 6 extending from the outer circumferential portion 2 to the inside of the center opening portion 3 and a second crosspiece portion 7 extending from the outer circumferential portion 2 to the inside of the center opening portion 3 intersect one another. The first crosspiece portion 6, the second crosspiece portion 7, and the intersecting region 8 form, along with the outer circumferential portion 2, each circumferential opening portion 9 that serves as a through-hole. Only the first crosspiece portion 6 and the second crosspiece portion 7 intersect the intersecting region 8, and there are no parts intersecting the intersecting region 8 except for these crosspiece portions. Note that the first crosspiece portion and the second crosspiece portion may be formed symmetrically in the inner circumferential portion 32 of the present invention, or alternatively, one crosspiece portion extending on the inner side beyond the outer circumferential portion 2 in the radial direction may be provided rather than the two crosspiece portions as described above, and the attachment hole 5 may be formed at the crosspiece portion. Alternatively, three or more crosspiece portions may be provided. In the latter case, the attachment hole may be formed at an intersecting portions thereof, for example.

Figure 4:
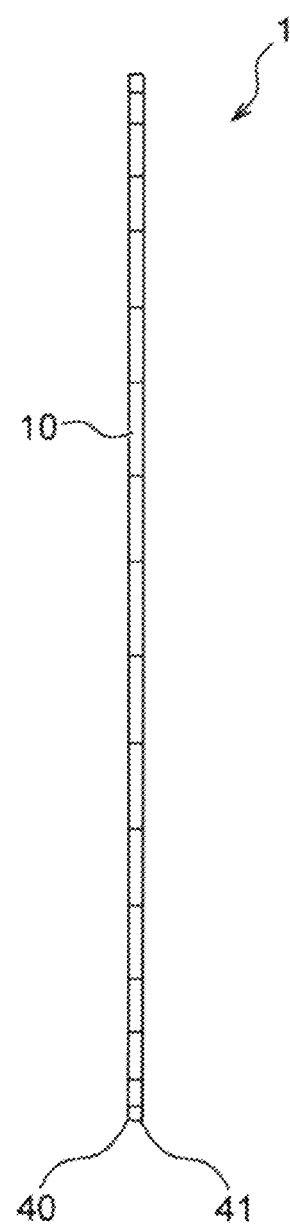
FIG. 4 is a side view of the brake disc according to the first embodiment.

As is obvious from the side view of FIG. 4, the brake disc 1 is formed into a plate shape such that the outer circumferential portion 2, the first crosspiece portion 6, the second crosspiece portion 7, the intersecting region 8, and the waveform portion 10 fall within a predetermined thickness range.

Figure 5:
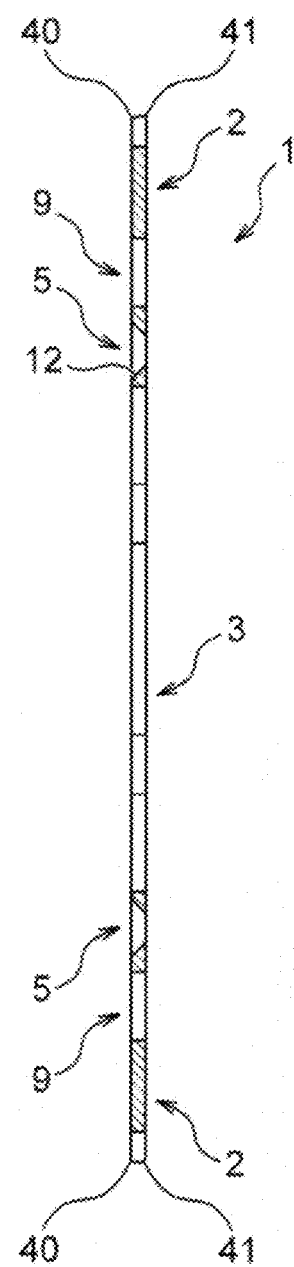
FIG. 5 is a sectional view of the brake disc according to the first embodiment taken along the line A-A in FIG. 1.

The brake disc 1 is attached to the wheel by pressing the brake back surface 17b illustrated in FIG. 2 against the wheel, causing bolts to pass through the attachment holes 5 from the brake front surface 17a illustrated in FIG. 1, and screwing the bolts into screw holes in the wheel. Therefore, the attachment holes 5 have, in front side surfaces, dish-shaped recessed portions 12 (FIG. 3) such that bolt heads can be seated as illustrated in FIGS. 1, 2, and 5. The attachment holes 5 are not limited to the example and may be through-holes with a columnar shape or through-holes that have dish-shaped parts with a rectangular section, for example.

In the brake disc 1 according to the first embodiment, the shapes and the sizes of the recessed portions 10a and the projecting portions 10b of the waveform portion 10, the number and the size of the through-holes 11, and the size of the circumferential opening portions 9 are defined to obtain, in the outer circumferential portion 2, substantially uniform heat capacity distribution in the circumferential direction and the radial direction. Moreover, the recessed portions 10a and the projecting portions 10b of the waveform portion 10, the through-holes 11, and the circumferential opening portions 9 are formed to increase the surface area of the side surface of the brake disc to thereby achieve desired cooling efficiency.

Here, the definition of "substantially uniform heat capacity distribution in the circumferential direction and in the radial direction" described in the present embodiment will be described using FIG. 7.

Figure 7A:
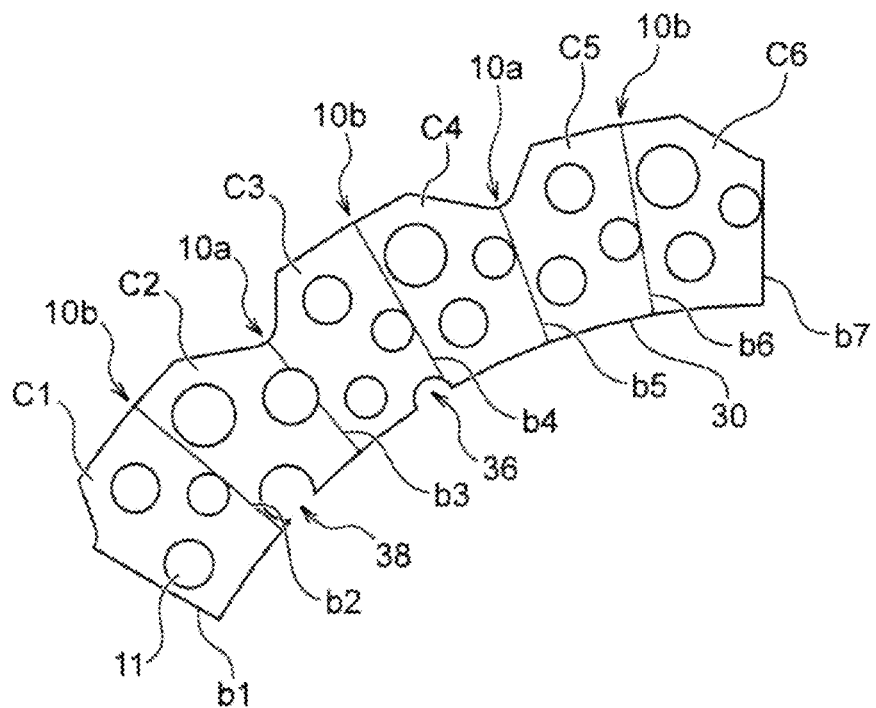
FIG. 7 is an outline partial view for explaining circumferential sections and radial sections in the brake disc according to the first embodiment, where FIG. 7(*a*) relates to the circumferential sections and FIG. 7(*b*) relates to the radial sections.
Figure 7B:
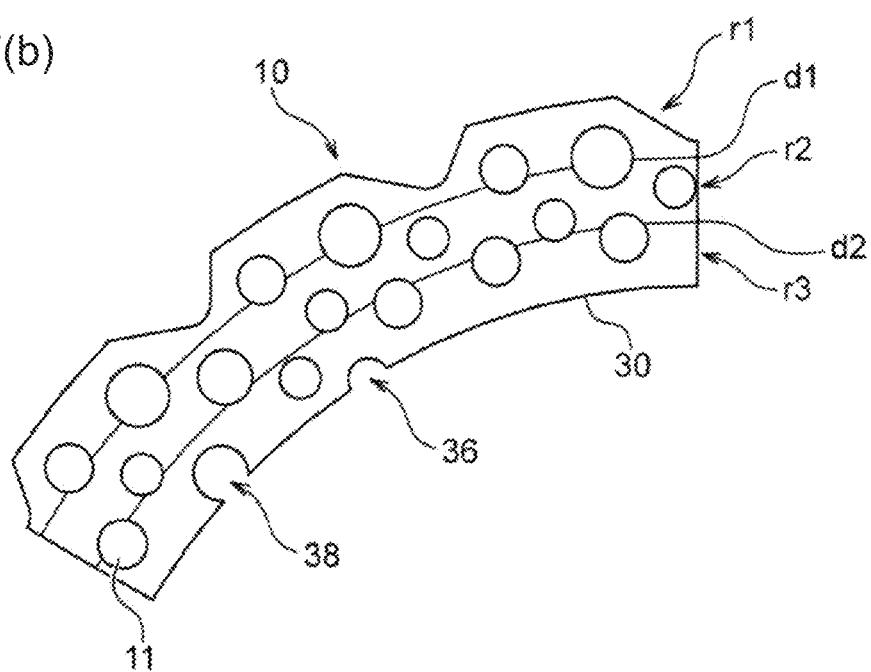

FIGS. 7(a) and 7(b) illustrate one section (a section corresponding to three projecting portions 10b and two recessed portions 10a) in the outer circumferential portion 2. It is a matter of course that the sections as illustrated in the drawings are applied to the entire circumference of the outer circumferential portion 2.

FIG. 7(a) illustrates circumferential sections $c1$, $c2$, $c3$, $c4$, $c5$, and $c6$ in the outer circumferential portion 2, which are sectioned at an equal angle in the circumferential direction, and FIG. 7(b) illustrates radial sections $r1$, $r2$, and $r3$ in the outer circumferential portion 2, which are sectioned to have an equal length in the radial direction.

The circumferential sections $c1$, $c2$, $c3$, $c4$, $c5$, and $c6$ are sectioned by virtual circumferential boundary lines $b1$, $b2$, $b3$, $b4$, $b5$, $b6$, and $b7$ drawn from the center O of the brake disc at an equal angle in the radial direction for convenience. Among these circumferential boundary lines, $b1$, $b3$, $b5$, and $b7$ are set to extend in the radial direction through minimum points of the recessed portions 10a, and the circumferential boundary lines $b2$, $b4$, and $b6$ are set to extend in the radial direction through maximum points of the projecting portions 10b. Note that the circumferential boundary lines $b1$, . . . illustrated in FIG. 7(a) are virtual lines only for an illustrative purpose, and other dividing ways are also included in the present embodiment. As the preferable number of divided sections in the circumferential direction is thirty to forty five, and in the aforementioned example, the outer circumferential portion 2 is divided into thirty six sections at every 10 degrees in the circumferential direction.

Since the uniform heat capacity distribution in the circumferential direction means that a difference in heat capacities among the circumferential sections $c1$, . . . decreases, the "substantially uniform heat capacity distribution in the circumferential direction" can be defined as a ratio of the difference in heat capacities among the circumferential sections with respect to each heat capacity among the circumferential sections $c1$, . . . being equal to or less than a first predetermined ratio.

On the other hand, the radial sections $r1$, $r2$, and $r3$ are obtained by equally dividing a part from the outermost edge of the outer circumferential portion 2 to the boundary line 30 between the outer circumferential portion 2 and the inner circumferential portion 32 into an equal length in the radial direction by two radial boundary lines d1 and d2. The radial boundary lines d1 and d2 illustrated in FIG. 7(b) are virtual lines only for an illustrative purpose, and other dividing ways are also included in the present embodiment. Preferably, the radial sections are at least three radial sections, and the radial section r1 on the outermost side has a length in the radial direction that includes the waveform portion 10 as illustrated in FIG. 7(b).

Since the uniform heat capacity distribution in the radial direction means that a difference in heat capacities among the radial sections r1, r2, and r3 decreases, the "substantially uniform heat capacity distribution in the radial direction" can be defined as a ratio of the difference in heat capacities among the circumferential sections relative to the heat capacity of each of the radial sections r1, r2, and r3 being equal to or less than a second predetermined ratio.

In order to clarify the aforementioned characteristic features of the brake disc 1 according to the present embodiment, a disc A in the related art will be described using FIGS. 14(a) and 14(b).

Figure 14A:
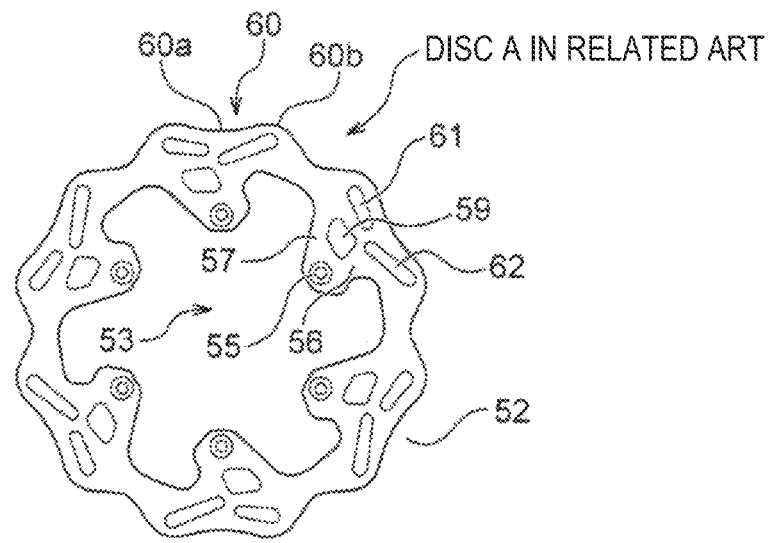
FIG. 14(a) is a front view of the disc A in the related art.
Figure 14B:
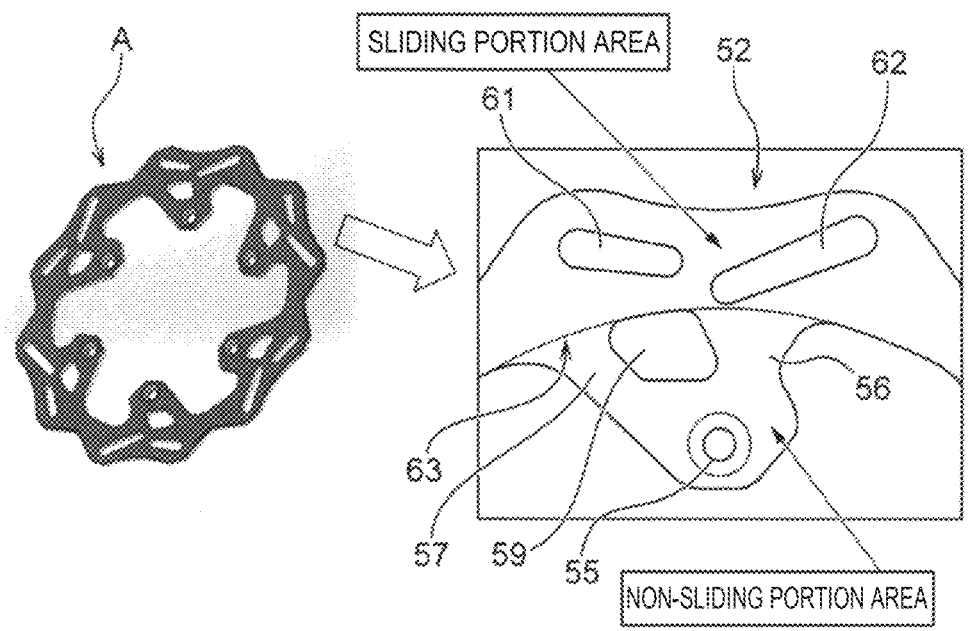
FIG. 14(b) is a perspective view of the disc A in the related art and illustrates a sliding portion area and a non-sliding portion area.

FIGS. 14(a) and 14(b) illustrate the disc A in the related art for comparison with the brake disc 1 according to the first embodiment. As illustrated in FIG. 14(a), an outer circumferential portion 52 of the disc A in the related art includes a waveform portion 60 in which recessed portions 60a and projecting portions 60b are repeatedly formed over an outer circumference and through-holes 61 and 62. A first crosspiece portion 56 extending to a center opening portion 53 at a smaller inclination angle with respect to the radial direction and a second crosspiece portion 57 extending to the center opening portion 53 at a larger inclination angle with respect to the radial direction are formed on the inner side of the outer circumferential portion 52 in the radial direction, and an attachment hole 55 is formed in each region which the first crosspiece portion 56 and the second crosspiece portion 57 intersect. The first crosspiece portion 56, the second crosspiece portion 57, and the intersecting region form, along with the outer circumferential portion 52, a circumferential opening portion 59.

Also, the outer circumferential portion 52 of the disc A in the related art serves as a sliding portion area of a brake pad, which is not illustrated, that is, a region on which the brake pad abuts while sliding, and an inner circumferential portion composed of the first crosspiece portion 56 and the second crosspiece portion 57 serves as a non-sliding portion area of the brake pad, that is, a region on which the brake pad does not abut as illustrated in FIG. 14(b). If a boundary line between the outer circumferential portion 52 and the inner circumferential portion is represented as 63, no through-holes crossing the boundary line 63 are formed in the disc A in the related art. On the other hand, the brake disc 1 according to the present embodiment includes the cleaning through-holes 36 and 38 across the boundary line 30 between the outer circumferential portion 2 and the inner circumferential portion 32.

FIG. 8 illustrates comparison between the brake disc 1 according to the present embodiment and the disc A in the related art.

Figure 8A:
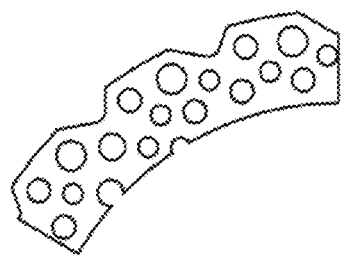
FIG. 8 is an outline partial view illustrating comparison between the brake disc according to the first embodiment and a disc A in the related art illustrated in FIG. 14, where FIG. 8(*a*) illustrates presence/absence of a non-cleaning portion, FIG. 8(*b*) illustrates an area of each radial section and a maximum area difference among the radial sections.
FIG. 8(c) illustrates an area of each circumferential section and a maximum area difference among the circumferential sections.
Figure 8A:
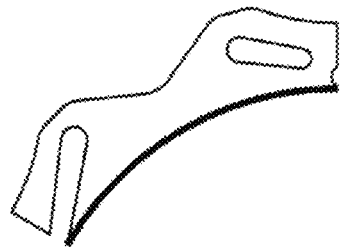

As illustrated in FIG. 8(a), the brake disc 1 is a disc that includes, on the outermost side of the outer circumferential portion 2, the waveform portion that functions as a cleaning portion for the brake pad, further includes the cleaning through-holes across the boundary line at the boundary line between the outer circumferential portion and the inner circumferential portion, and does not include any non-cleaning portions. On the other hand, although the disc A in the related art includes, on the outermost side of the outer circumferential portion 2, the waveform portion that functions as a cleaning portion for the brake pad, no cleaning portions are formed at the boundary line between the sliding portion area and the non-sliding portion area as described above in FIG. 14(b). Therefore, there is a non-cleaning portion (thick line) on the boundary line in the state.

Figure 8B:
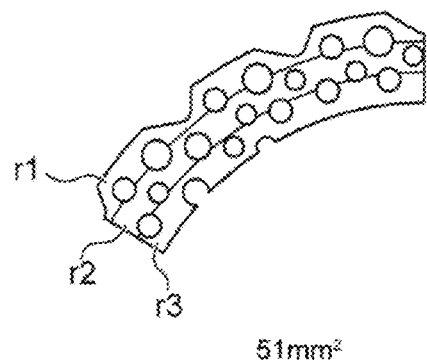
Figure 8B:
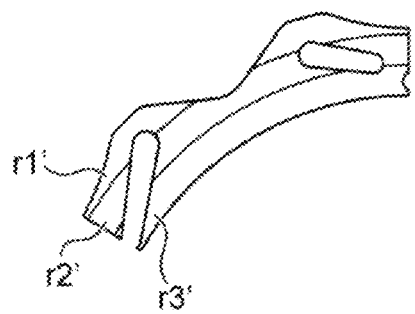

Also, FIG. 8(b) illustrates an area of each radial section and a maximum area difference among the radial sections in each of the present brake disc 1 and the disc A in the related art. As illustrated in the drawing, each of the areas of radial sections r1', r2', and r3' in the disc A in the related art is 522 mm$^2$, 750 mm$^2$, and 855 mm$^2$, and the maximum area difference among the radial sections (the area of r3'-the area of r1') is 333 mm$^2$. On the other hand, each of the areas of the radial sections r1, r2, and r3 in the present brake disc 1 is 680 mm$^2$, 730 mm$^2$, and 725 mm$^2$, and the maximum area difference among the radial sections (the area of r2-the area of r1) is 50 mm$^2$.

On the assumption that the plate thicknesses are uniform over the entire regions and are the same and the materials are also uniform and are the same in these two brake discs, the area of each section corresponds to the heat capacity of each section.

Therefore, it is possible to state that the ratio of the differences in heat capacities among the radial sections with respect to the heat capacity of each radial section in the present brake disc 1 is significantly smaller than that in the disc A in the related art, and that the heat capacity distribution in the radial direction is substantially uniform in the present brake disc 1.

Figure 8C:
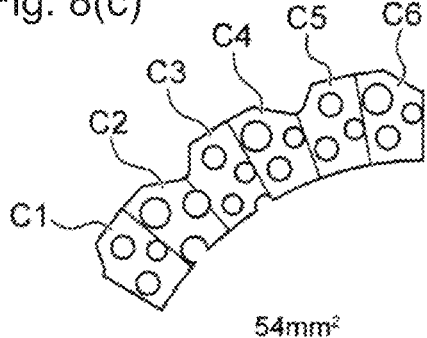
Figure 8C:
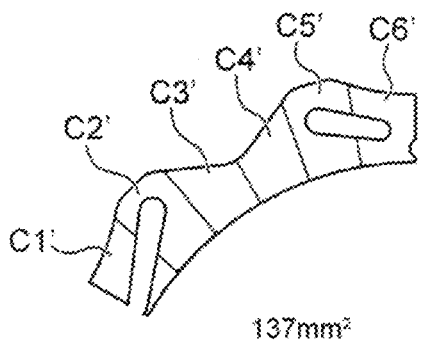

FIG. 8(c) illustrates an area of each circumferential section and a maximum area difference among the radial sections in each of the present brake disc 1 and the disc A in the related art. As illustrated in the drawing, the area of each of circumferential sections c1' to c6' in the disc A in the related art is 277 mm$^2$ to 356 mm$^2$, and the maximum area difference among the circumferential sections (the area of c5'-the area of c1') is 137 mm$^2$. On the other hand, the area of each of the radial sections c1 to c6 in the present brake disc 1 is 382 mm$^2$ to 341 mm$^2$, and the maximum area difference among the circumferential sections (the area of c5-the area of c2) is 64 mm$^2$.

Therefore, it is possible to state that the ratio of the difference in heat capacities among the circumferential sections with respect to the heat capacity of each circumferential section in the present brake disc 1 is significantly smaller than that in the disc A in the related art, and that the heat capacity distribution in the circumferential direction is substantially uniform in the present brake disc 1.

As described above, it is possible to regard the present brake disc 1 as having substantially uniform heat capacity distribution in the circumferential direction and the radial direction. In the brake disc 1 illustrated in FIG. 8, the ratio of the difference in heat capacities among the circumferential sections with respect to the heat capacity of each circumferential section is 25% or less. Also, the ratio of the difference in heat capacities among the radial sections with respect to the heat capacity of each radial section is 8% or less in the present brake disc 1. Therefore, it is possible to set the first predetermined ratio to 25% and to set the second predetermined ratio to 8%.

FIG. 9 illustrates a comparison diagram similar to FIG. 8 for discs B, C, and D other than the disc A in the related art. The disc B in the related art is a disc including a waveform portion with a shape different from that in the disc in the related art, the disc C in the related art has a smaller amplitude in a waveform portion, the disc D in the related art is a perfect circle disc.

Figure 9A:
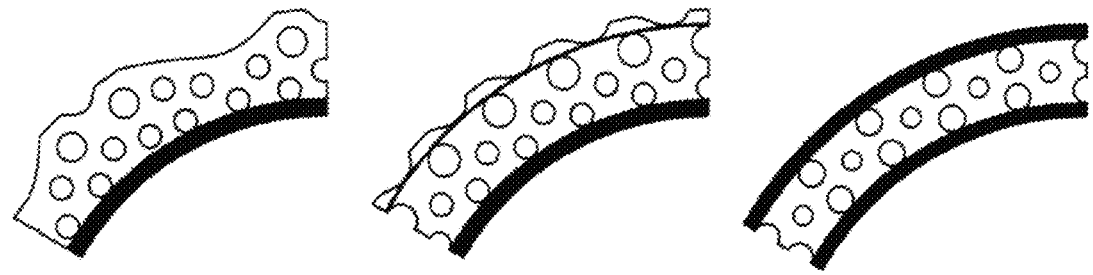
FIG. 9(a) illustrates presence/absence of a non-cleaning portion.

As illustrated in FIG. 9(a), all the discs in the related art include non-cleaning portions. Particularly, the disc C in the related art including a smaller waveform portion and the disc D in the related art with no waveform portion include non-cleaning portions even on the outermost sides.

Figure 9B:
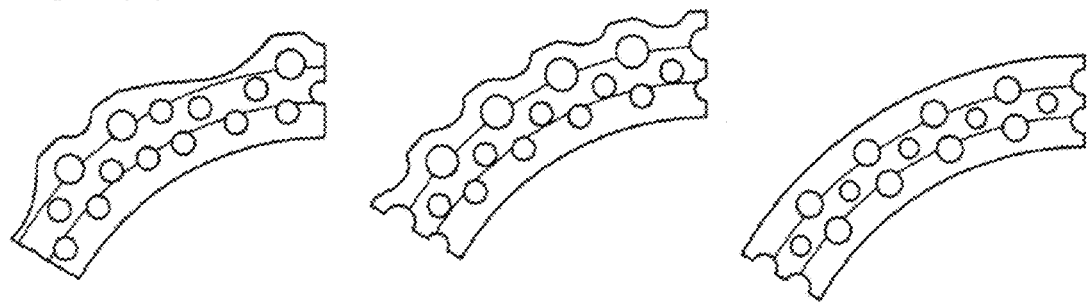
FIG. 9(b) illustrates an area of each radial section and a maximum area difference among the radial sections.

As illustrated in FIG. 9(b), the maximum area differences among the radial sections in the discs B, C, and D in the related art are larger than that of the present brake disc 1, and the ratios of heat capacities among the radial sections with respect to the heat capacity of each radial section are also higher.

Figure 9C:
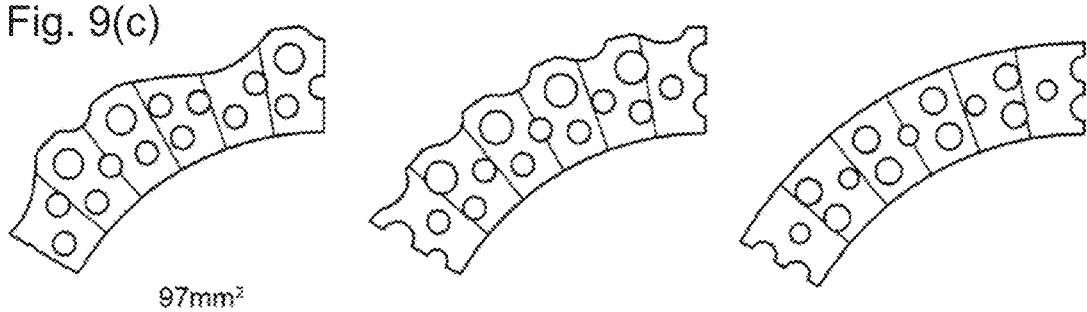
FIG. 9(c) illustrates an area of each circumferential section and a maximum area difference among the circumferential sections.

Although it is possible to significantly reduce the area differences among the circumferential sections in the discs C and D in the related art as illustrated in FIG. 9(c), the maximum area difference among the circumferential sections and the ratio thereof with respect to the area of each section in the disc B in the related art including the waveform portion that functions as a cleaning portion are larger than those of the present disc 1.

As is obvious from the above description, a disc in which a ratio of a difference in heat capacities among circumferential sections relative to a heat capacity of each circumferential section is equal to or less than the first predetermined ratio (25%), a ratio of a difference in heat capacities among radial sections relative to a heat capacity of each radial section is equal to or less than the second predetermined ratio (8%), and the non-cleaning portion is not present is only the brake disc 1 according to the present embodiment.

FIG. 10 illustrates summary of the aforementioned comparison related to the heat capacities and the surface areas of the brake disc 1 according to the present embodiment and the disc A in the related art.

In the brake disc 1 and the disc A in the related art, the heat capacities of the entire outer circumferential portions that are sliding portion areas of the brake pads are substantially the same values (about 166 J/K). However, in regard to the maximum differences in heat capacities in the circumferential direction, the disc A in the related art has a maximum difference of 1.8 J/K while the present brake disc 1 has a maximum difference of 0.6 J/K and achieves a significantly small difference in heat capacities in the circumferential direction. Also, in regard to the maximum differences in heat capacities in the radial direction, the disc A in the related art has a maximum difference of 4.4 J/K while the present brake disc 1 has a maximum difference of 0.7 J/K and achieves a significantly small difference in heat capacities in the radial direction. In regard to the surface areas of the side surfaces (the areas of parts when seen from side surfaces other than the brake front surfaces and the brake back surfaces), the disc A in the related art has the surface area of 1487 $mm^2$ while the present brake disc 1 has the surface area of 2469 $mm^2$, which is significantly large. This is because the present brake disc 1 can increase the surface area of the side surface through adjustment of the shape and the size of the waveform portion and the arrangement, the number, and the size of the through-holes (9, 11, 36, and 38).

Therefore, the present brake disc 1 can have significantly improved cooling efficiency without increasing the heat capacity itself by having substantially uniform heat capacity distribution in the circumferential direction and in the radial direction and increasing the surface area of the side surface.

Figure 11A:
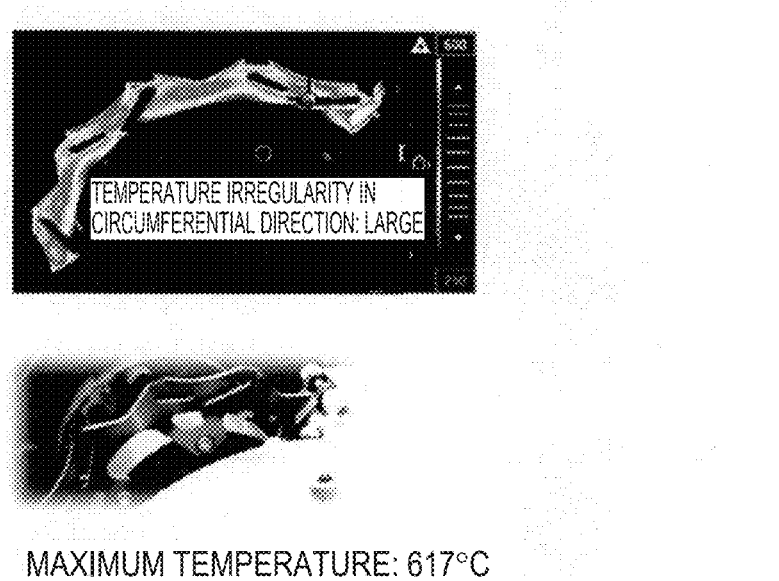
FIG. 11 is a temperature distribution diagram illustrating temperature irregularities in the circumferential direction and maximum temperatures of the disc A in the related art and the disc according to the first embodiment, where FIG. 11(a) relates to the disc A in the related art, and FIG. 11(b) relates to the disc according to the first embodiment.
Figure 11B:
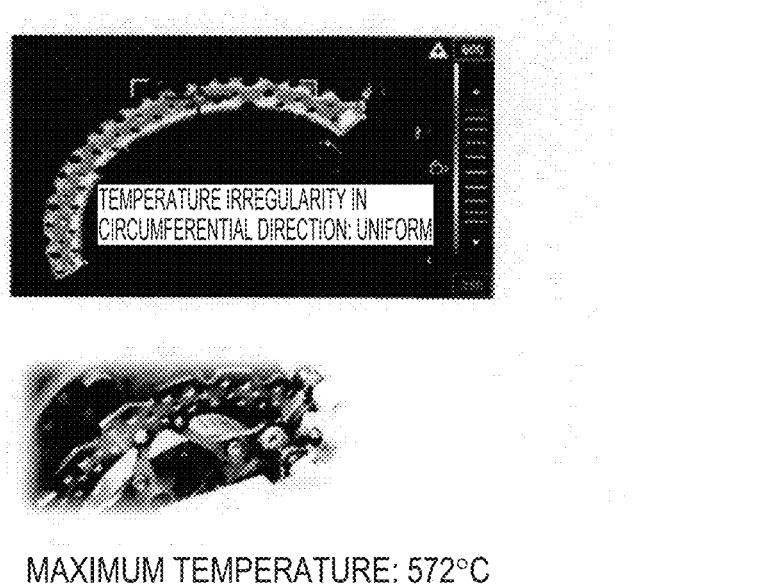

FIG. 11 illustrates temperature measurement results of the disc A in the related art and the brake disc A according to the present embodiment under the same conditions.

As illustrated in FIG. 11(a), large temperature irregularity in the circumferential direction is present in the disc A in the related art, and the highest temperature reaches 617° C. On the other hand, temperature irregularity in the circumferential direction is uniform in the brake disc 1 according to the present embodiment while the weight, that is, the heat capacity of the sliding portion area is maintained to be the same as that of the disc in the related art, and it is also possible to drop the highest temperature to 572° C.

In other words, according to the present embodiment, it is possible to reduce the disc weight even with a specification in which the same highest temperature as that of the disc A in the related art is reached.

As described above, according to the present embodiment, it is possible to uniformize temperature irregularity and to enhance cooling efficiency even if the heat capacity is equivalent to that of the disc in the related art, and it is thus possible to achieve better brake feeling.

Second Embodiment

According to the first embodiment, the entire brake disc 1 is integrally molded. The brake disc according to the present invention is not limited thereto and can be composed of two or more components. This example will be described as a second embodiment using FIGS. 12 and 13. Note that for constituent requirements in the second embodiment that are similar to those in the first embodiment, b will be applied to the same reference signs as those in the first embodiment, and detailed description will be omitted.

Figure 12:
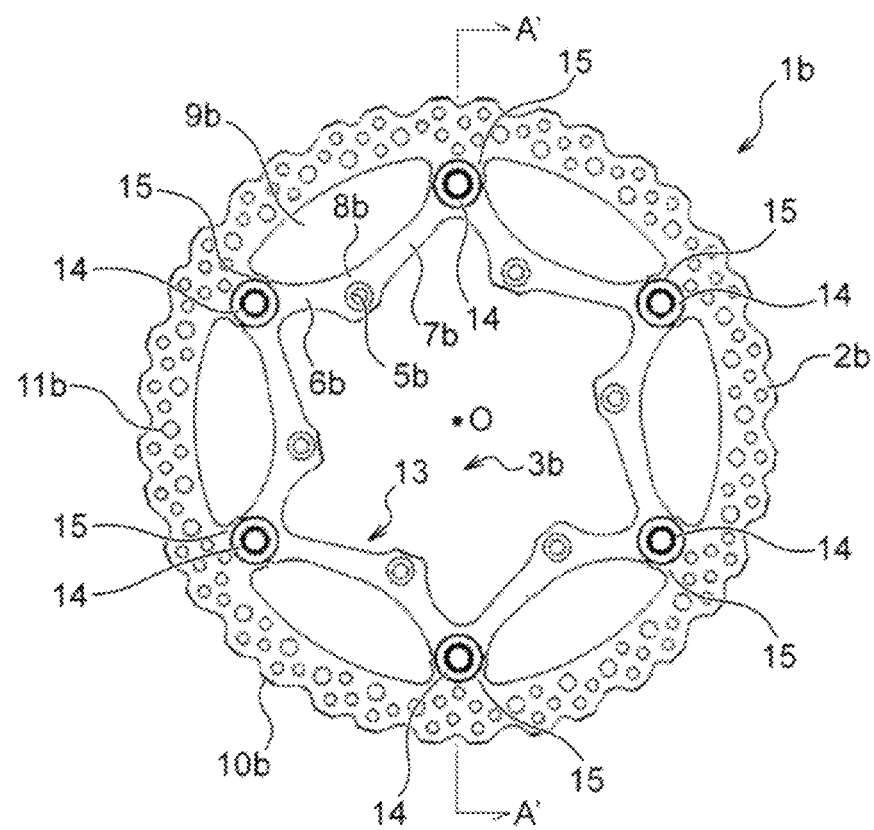
FIG. 12 is a front view of a brake disc according to a second embodiment of the present invention.
Figure 13:
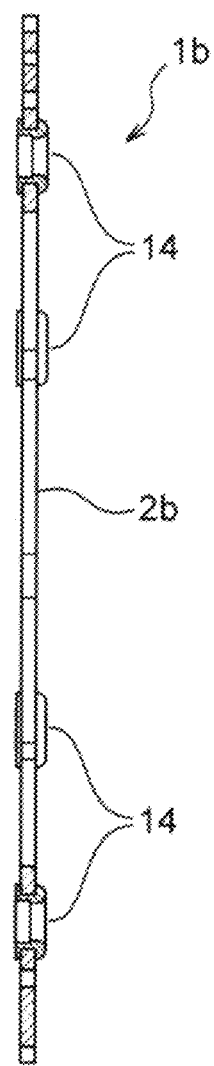
FIG. 13 is a sectional view of the brake disc according to the second embodiment taken along the line A'-A' in FIG. 12.

As illustrated in FIGS. 12 and 13, a brake disc 1b according to the second embodiment includes an outer circumferential portion 2b and a crosspiece inner circumferential portion 13, and the crosspiece inner circumferential portion 13 is coupled to the outer circumferential portion 2b via a plurality of bridge portions 15 extending from the outer circumferential portion 2b to a center opening portion 3b and pins 14.

All first crosspiece portions 6b and second crosspiece portions 7b of the brake disc 1b are integrally formed in the crosspiece inner circumferential portion 13, and each attachment hole 5b is formed in each region 8b in which the first and second crosspiece portions intersect one another. Note that the plurality of attachment holes 5b include attachment holes at different distances from the center O.

Note that composite arc parts 20 to 24 and recessed stretching portions 25 to 27 may be formed in the second embodiment as well.

According to the second embodiment, it is possible to provide a brake disc that becomes compatible merely through exchange of the crosspiece inner circumferential portion 13 in accordance with a specification of a wheel, as well as to achieve advantageous effects similar to those of the first embodiment. Conversely, it is also possible to exchange only the outer circumferential portion 2b due to wear or the like.

Although the brake disc according to the embodiments of the present invention has been described hitherto, the present invention is not limited to the above examples and can be changed in an arbitrary suitable manner within the scope of the present invention.

REFERENCE SIGNS LIST 1, 1b Brake disc
2, 2b Outer circumferential portion
3, 3b Center opening portion 5, 5b Attachment hole
6, 6b First crosspiece portion
7, 7b Second crosspiece portion
8, 8b Intersecting region
9, 9b Circumferential opening portion
10 Waveform portion
10a Recessed portion
10b Projecting portion
11, 11b Through-hole
12 Dish-shaped recessed portion
13 Crosspiece inner circumferential portion
14 Pin
15 Bridge portion
17a Brake front surface
17b Brake back surface
20 Side part of recessed portion 10a (side at 45° or less relative to radial direction)
21 Side of recessed portion 10a (side at 45° or more relative to radial direction)
30 Boundary line between outer circumferential portion 2 and inner circumferential portion 32
32 Inner circumferential portion
36, 38 Cleaning through-hole
b1, b2, b3, b4, b5, b6, b7 Circumferential boundary line
c1, c2, c3, c4, c5, c6 Circumferential section
d1, d2 Radial boundary line
r1, r2, r3 Radial section

The invention claimed is:

1. A brake disc comprising:
an outer circumferential portion that serves as a sliding portion area of a brake pad and includes a waveform portion in which recessed portions and projecting portions are repeatedly formed over an outer circumference,
wherein in order for the outer circumferential portion to have substantially uniform heat capacity distribution in a circumferential direction and in a radial direction,
the outer circumferential portion is formed such that
a ratio of a maximum difference in heat capacities among a plurality of circumferential sections in the outer circumferential portion, which are sectioned at an equal angle in the circumferential direction, relative to a heat capacity of each circumferential section is equal to or less than a first predetermined ratio, and
a ratio of a maximum difference in heat capacities among a plurality of radial sections in the outer circumferential portion, which are sectioned to have an equal length in the radial direction, relative to a heat capacity of each radial section is equal to or less than a second predetermined ratio.

2. The brake disc according to claim 1, further comprising:
an inner circumferential portion that is formed on an inner side of the outer circumferential portion in the radial direction and serves as a non-sliding portion area of the brake pad,
wherein a cleaning through-hole is formed across a boundary line between the outer circumferential portion and the inner circumferential portion, and an inner edge portion of the brake pad in the radial direction is able to intersect the cleaning through-hole.

3. The brake disc according to claim 2, wherein the inner circumferential portion and the outer circumferential portion are integrally molded.

4. The brake disc according to claim 2, wherein the inner circumferential portion is coupled to the outer circumferential portion with coupling means.

5. The brake disc according to claim 1, wherein a plurality of through-holes are formed in the brake disc.

6. The brake disc according to claim 5, wherein the recessed portions and the projecting portions of the waveform portion and the through-holes are formed to increase a surface area of a side surface of the brake disc to thereby achieve desired cooling efficiency.

7. The brake disc according to claim 1, wherein each of the circumferential sections is defined by a first circumferential boundary line extending in the radial direction through a minimum point of the recessed portions and a second circumferential boundary line extending in the radial direction through a maximum point of the projecting portions, and the first predetermined ratio is 25%.

8. The brake disc according to claim 1, wherein the plurality of radial sections are at least three radial sections, a radial section on an outermost side has a length in the radial direction that includes the waveform portion, and the second predetermined ratio is 8%.

9. The brake disc according to claim 1, wherein the recessed portions of the waveform portion are formed in an asymmetric manner.

* * * * *